United States Patent
Kolberg et al.

(10) Patent No.: US 9,804,948 B2
(45) Date of Patent: Oct. 31, 2017

(54) SYSTEM, METHOD, AND COMPUTER PROGRAM PRODUCT FOR SIMULATING AT LEAST ONE OF A VIRTUAL ENVIRONMENT AND A DEBUGGING ENVIRONMENT TO PREVENT UNWANTED CODE FROM EXECUTING

(71) Applicant: McAfee, Inc., Santa Clara, CA (US)

(72) Inventors: Dirk Kolberg, Hamburg (DE); Lukesh Kumar, Chennai (IN); Kevin Andrew Gudgion, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/314,783

(22) Filed: Jun. 25, 2014

(65) Prior Publication Data
US 2014/0372991 A1    Dec. 18, 2014

Related U.S. Application Data

(63) Continuation of application No. 12/102,512, filed on Apr. 14, 2008, now Pat. No. 8,782,615.

(51) Int. Cl.
*G06F 9/44*      (2006.01)
*G06F 11/36*     (2006.01)
*G06F 9/455*     (2006.01)

(52) U.S. Cl.
CPC .......... *G06F 11/362* (2013.01); *G06F 9/455* (2013.01); *G06F 9/45558* (2013.01); *G06F 11/3664* (2013.01); *G06F 2009/45587* (2013.01)

(58) Field of Classification Search
CPC ................. G06F 11/362; G06F 9/455
USPC .......................................................... 717/135
See application file for complete search history.

(56) References Cited

U.S. PATENT DOCUMENTS

| | | | |
|---|---|---|---|
| 7,093,239 B1 * | 8/2006 | van der Made | 717/135 |
| 7,349,931 B2 * | 3/2008 | Horne | |
| 8,201,246 B1 * | 6/2012 | Wu | G06F 21/554 703/23 |
| 2005/0223239 A1 * | 10/2005 | Dotan | 713/188 |
| 2005/0246453 A1 * | 11/2005 | Erlingsson et al. | 710/1 |
| 2006/0235664 A1 | 10/2006 | Vinberg et al. | |
| 2008/0040710 A1 | 2/2008 | Chiriac | |

OTHER PUBLICATIONS

Spring, "Tunneling, Armored, and Retro Viruses", CS 351, Defense Against the Dark Arts, University of Virginia, 2007, Slides 21-30, 5 Pages. available at: <http://www.cs.virginia.edu/~cs351-dada/Lectures/TunnelArmorRetro.pdf>.
Final Office Action received for U.S. Appl. No. 12/102,512, mailed on Jan. 19, 2012, 23 Pages.
Final Office Action received for U.S. Appl. No. 12/102,512, mailed on Nov. 26, 2013, 16 Pages.

(Continued)

*Primary Examiner* — Wei Zhen
*Assistant Examiner* — Lanny Ung
(74) *Attorney, Agent, or Firm* — Blank Rome LLP

(57) ABSTRACT

A system, method, and computer program product are provided for simulating at least one of a virtual environment and a debugging environment to prevent unwanted code from executing. In use, at least one of a virtual environment and a debugging environment is simulated. Additionally, unwanted code is prevented from executing as a result of the simulation.

18 Claims, 5 Drawing Sheets

(56) References Cited

OTHER PUBLICATIONS

Non-Final Office Action received for U.S. Appl. No. 12/102,512, mailed on Aug. 17, 2011, 16 Pages.
Non-Final Office Action received for U.S. Appl. No. 12/102,512, mailed on Jul. 25, 2013, 14 Pages.
Notice of Allowance received for U.S. Appl. No. 12/102,512, mailed on Mar. 10, 2014, 7 Pages.

* cited by examiner

SYSTEM, METHOD, AND COMPUTER PROGRAM PRODUCT FOR SIMULATING AT LEAST ONE OF A VIRTUAL ENVIRONMENT AND A DEBUGGING ENVIRONMENT TO PREVENT UNWANTED CODE FROM EXECUTING

CROSS REFERENCE TO RELATED APPLICATIONS

This Application claims priority to U.S. patent application Ser. No. 12/102,512 entitled "SYSTEM, METHOD, AND COMPUTER PROGRAM PRODUCT FOR SIMULATING AT LEAST ONE OF A VIRTUAL ENVIRONMENT AND A DEBUGGING ENVIRONMENT TO PREVENT UNWANTED CODE FROM EXECUTING" filed Apr. 14, 2008, which is incorporated by reference in its entirety herein.

TECHNICAL FIELD

The present invention relates to computer security systems, and more particularly to preventing the execution of unwanted code.

BACKGROUND ART

Many techniques exist that attempt to protect against unwanted code (e.g., malware, etc.). For example, virtual machines may be used to run and analyze (e.g., debug) unwanted code on a system. In another example, debuggers may be used to analyze unwanted code and attempt to reverse engineer the code. These techniques attempt to collect information about the unwanted code, event when source code for the unwanted code is unavailable.

However, such techniques generally exhibit various limitations in detecting unwanted code. For example, authors of unwanted code may protect and/or pack the unwanted code for preventing detection thereof by a virtual machine. Protectors and packers are widely available, and code that is easily compressed or packed may be difficult or impossible to unpack or replicate, by existing methods. As another example, authors of unwanted code may disable execution of the code to prevent detection thereof by a debugger. Thus, utilizing current techniques may result in unwanted code that is resistant to detection.

SUMMARY

A system, method, and computer program product are provided for simulating at least one of a virtual environment and a debugging environment to prevent unwanted code from executing. In use, at least one of a virtual environment and a debugging environment is simulated. Additionally, unwanted code is prevented from executing as a result of the simulation.

DESCRIPTION OF EMBODIMENTS

Figure 1:
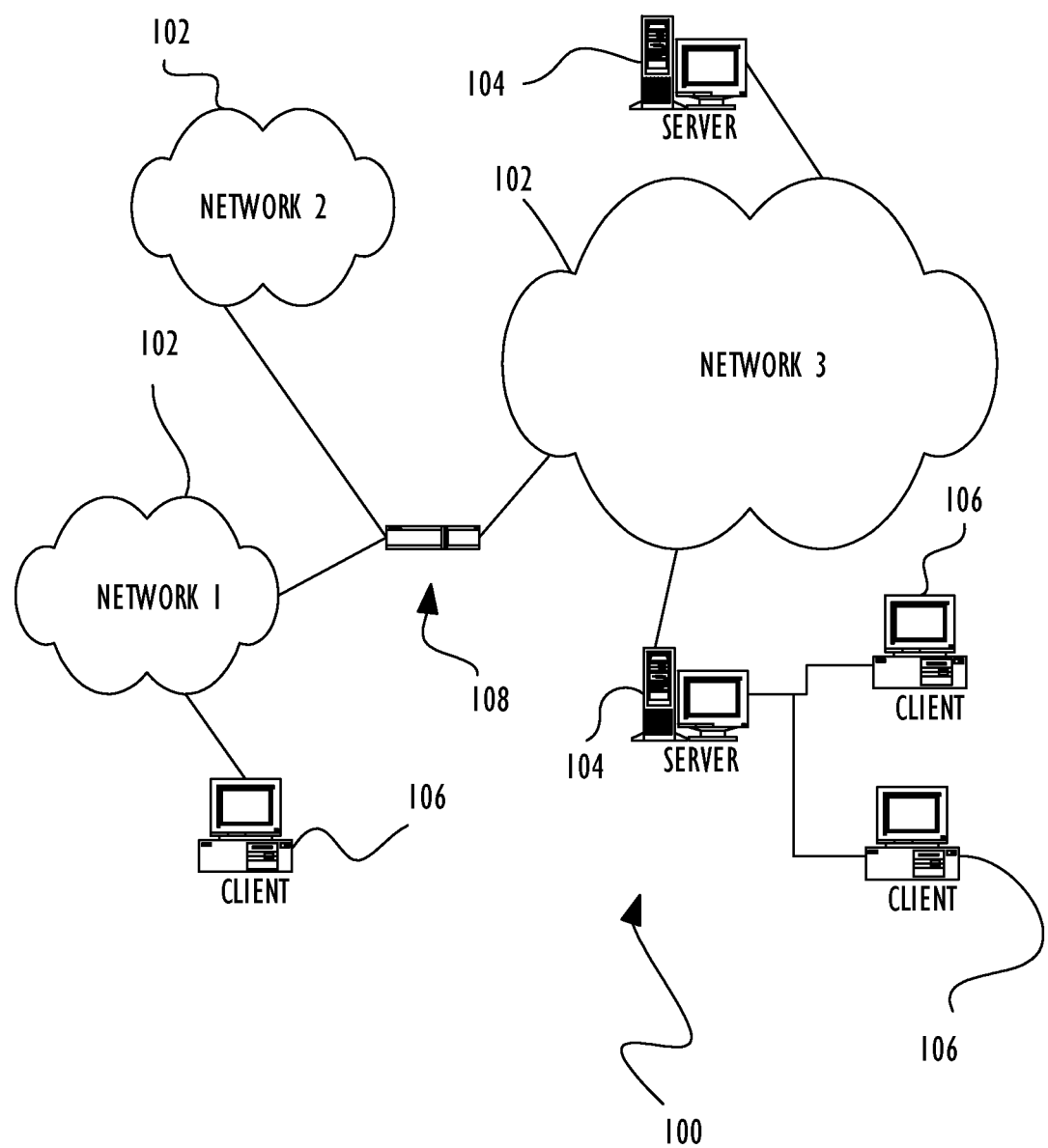
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
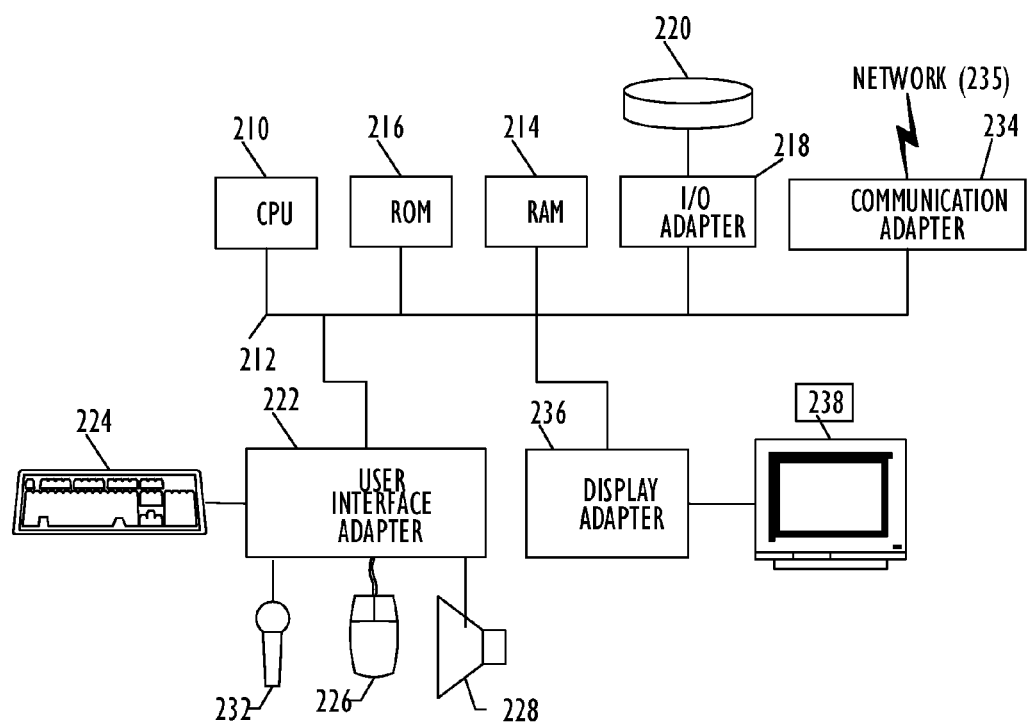
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
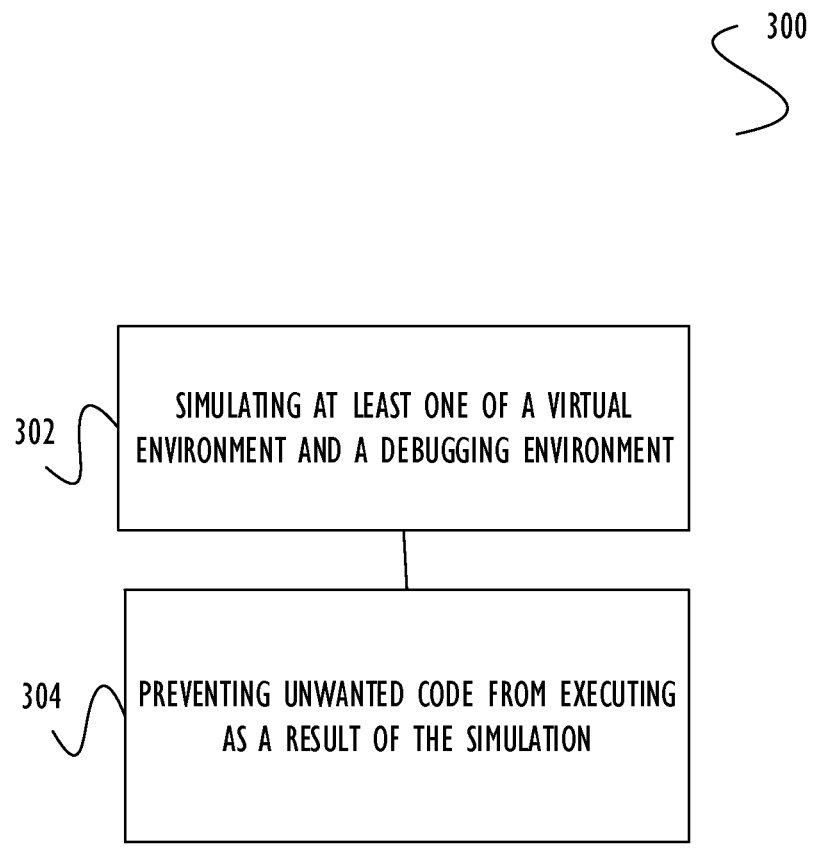
FIG. 3 shows a method for simulating at least one of a virtual environment and a debugging environment to prevent unwanted code from executing, in accordance with one embodiment.

FIG. 3 shows a method 300 for simulating at least one of a virtual environment and a debugging environment to prevent unwanted code from executing, in accordance with one embodiment. As an option, the method 300 may be carried out in the context of the architecture and environment of FIGS. 1 and/or 2. Of course, however, the method 300 may be carried out in any desired environment.

As shown in operation 302, at least one of a virtual environment and a debugging environment is simulated. In the context of the present description, the virtual environment may include any environment that is virtual in nature. In one embodiment, the virtual environment may include virtualization software. For example, the virtual environment may include a virtual machine. Accordingly, the virtual environment may be simulated, as an option.

Additionally, in the context of the present description, the debugging environment may include any environment that is used for debugging code or other data. In one embodiment, the debugging environment may include debugging software. For example, the debugging environment may include a debugger. To this end, the debugging environment may be simulated, as another option.

Further, in one embodiment, the simulation may include including a file and/or a folder with a predetermined identifier. For example, the file and/or folder may be included in (e.g. stored in, etc.) a system. Such system may optionally include a computer system capable of simulating the virtual environment and/or debugging environment.

In the context of the present embodiment, the identifier may include a vendor name, a manufacturer name, version identifier, and/or any other identifier that is predetermined. In another embodiment, the identifier may be associated with the virtual environment and/or the debugging environment. As an option, the identifier may indicate a presence of the virtual environment and/or debugging environment on the system. For example, files that are associated with the debugging environment and/or the virtual environment may be included under a "% programfiles %" directory and/or any other directories. In another example, registry entries belonging to the debugging environment and/or the virtual environment may be included in a registry.

In another embodiment, the simulation may include simulating hardware with a predetermined identifier. The identifier may be associated with the virtual environment and/or the debugging environment. As an option, the predetermined identifier may include a name of the hardware. The hardware may be utilized for implementing the virtual environment and/or the debugging environment. For example, a graphics card may be simulated with a name and/or other information typically used by a virtual and/or debugging environment. In another example, a compact disc (CD) drive may be simulated with information typically found in a virtual and/or debugging environment.

In yet another example, a network card may be simulated with a typical virtual and/or debugging name. Also, in still another example, all or part of a media access control (MAC) address of the network card may be simulated with all or part of a MAC address typically used by a virtual and/or debugging environment.

In still yet another embodiment, the simulation may include simulating one or more elements of firmware associated with the virtual and/or debugging environment. For example, the simulation may include simulating one or more elements of a basic input/output system (BIOS) with elements typically used by a virtual and/or debugging environment.

Additionally, in yet another embodiment, the simulation may include maintaining a predetermined port open. The open port may be associated with the virtual environment and/or the debugging environment. For example, a network port may by kept open. In this way, it may optionally appear that a communication has been established between a host system and the virtual environment and/or the debugging environment, thus simulating the virtual environment and/or the debugging environment.

Further, in still another embodiment, the simulation may include simulating an execution of a predetermined process. The predetermined process may be associated with the virtual environment and/or the debugging environment. For example, a name of an executable associated with the virtual environment and/or the debugging environment may be included in a list of running processes. In another example, an operating system may return the name of an executable indicative of the virtual environment and/or the debugging environment in response to a query for running processes, thus simulating the virtual environment and/or the debugging environment.

Further still, in another embodiment, the simulation may include simulating a predetermined central processing unit command. The predetermined central processing unit command may be associated with the virtual environment and/or the debugging environment. For example, the predetermined central processing unit commands may be simulated as occurring during a virtual environment session and/or a debugging environment session. In another example, calls and/or execution of program code may be simulated.

In yet another embodiment, hardware acceleration indicative of the debugger and/or virtual machine may be simulated. Further, in another embodiment, an application programming interface (API) response may be simulated. For example, a positive response may be given to an API call requesting an indication of whether the virtual environment or the debugging environment is present.

In still yet another embodiment, the simulation may include incorporating one or more keywords indicating the presence of the virtual environment and/or the debugging environment into a title of a window. For example, keywords such as "process monitor," "file monitor," and/or "registry monitor" may be incorporated into the window title. Furthermore, in another embodiment, the simulation may include increasing the amount of time taken to execute one or more portions of the code or other data.

Also, in one embodiment, the simulation of the virtual environment and/or the debugging environment may be incorporated into a software product. For example, a desktop anti-malware product may perform the simulation.

Additionally, as shown in operation 304, unwanted code is prevented from executing as a result of the simulation. In the context of the present description, the unwanted code may include any code that is unwanted. In one embodiment, the unwanted code may include an unwanted program, process, file, folder, etc. In another embodiment, the unwanted code may include an instance of malware. For example, the unwanted code may include a virus, a worm, a Trojan horse, spyware, etc. In yet another embodiment, the unwanted code may include an instance of adware.

Also, in one embodiment, the unwanted code may be compressed. As an option, the unwanted code may be compressed by being packed (e.g. by a packer application, etc.). For example, the unwanted code may be runtime packed. In another embodiment, the unwanted code may be packed in a polymorphic manner. For example, unwanted code may appear different each time the unwanted code is compressed by the packer application.

Furthermore, in yet another embodiment, the unwanted code may be protected. For example, the unwanted code may be protected against actions such as disassembling, decompilation, debugging, analysis, etc. In another embodiment, the unwanted code may require that a condition is met before the unwanted code executes. For example, the unwanted code may detect whether the unwanted code is being debugged in a debugging environment or being run in a virtual environment, and may not execute if such debugging environment and/or virtual environment are present. In another example, the unwanted code may detect the location of the unwanted code, and may execute only if the unwanted code is found to be in a particular location (e.g. outside of the debugging environment and/or virtual environment, etc.).

In addition, in one embodiment, as a result of the simulation, the unwanted code may determine that the virtual environment and/or debugging environment exist (e.g. that unwanted code is located in the virtual environment and/or the debugging environment, etc.). For example, the unwanted code may search for and find the file or the folder with the identifier associated with the virtual environment and/or the debugging environment. In another example, the unwanted code may search for and find the simulated hardware associated with the virtual environment and/or the debugging environment. Additionally, in another example, the unwanted code may search for and find the simulated elements of firmware associated with the virtual and/or debugging environment.

In yet another example, the unwanted code may search for and find the simulated open port associated with communication between the host system and the virtual environment and/or the debugging environment. In still another example, the unwanted code may search for and find the simulated process associated with the virtual environment and/or the debugging environment.

In still yet another example, the unwanted code may search for and find the central processing unit command associated with the virtual environment and/or the debugging environment. Additionally, in another example, the unwanted code may detect hardware acceleration indicative of the virtual environment and/or the debugging environment. Also, in yet another example, the unwanted code may perform the API call requesting whether the virtual environment and/or the debugging environment is present, and may receive a positive response to the API call indicating the presence of the virtual environment and/or the debugging environment.

Further, in another example, the unwanted code may check the title of one or more windows and may detect one or more keywords indicating the presence of the virtual environment and/or the debugging environment in the title of the windows. Additionally, in yet another example, the unwanted code may time the execution of one or more portions of the code or other data and may determine from the amount of time taken to execute the code or data that the virtual environment and/or the debugging environment is present.

Also, in one embodiment, the simulation of the virtual environment and the debugging environment may be performed by creating a layer between the operating system and the unwanted code. In another embodiment, the layer may indicate to the unwanted code that the virtual environment and/or the debugging environment is installed and/or executing on the operating system. For example, the layer may positively respond to queries from the unwanted code that the virtual environment and/or the debugging environment are installed and/or executing. In this way, the unwanted code may determine that the unwanted code is located in the virtual environment and/or the debugging environment, even though elements of the virtual environment and/or the debugging environment are nonexistent with respect to the operating system.

Further, in another embodiment, the unwanted code may fail to execute as a result of the determination that the unwanted code is located in the virtual environment and/or the debugging environment. For example, the unwanted code may purposefully avoid execution if the unwanted code is determined to be in the virtual environment and/or the debugging environment. Of course, however, the execution of the unwanted code may be prevented in any manner as a result of the simulation.

In this way, the unwanted code may fail to execute as a result of the simulation of the virtual environment and/or the debugging environment. Additionally, the unwanted code may be packed and/or protected once or multiple times, and may still be prevented from executing as a result of the simulation.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
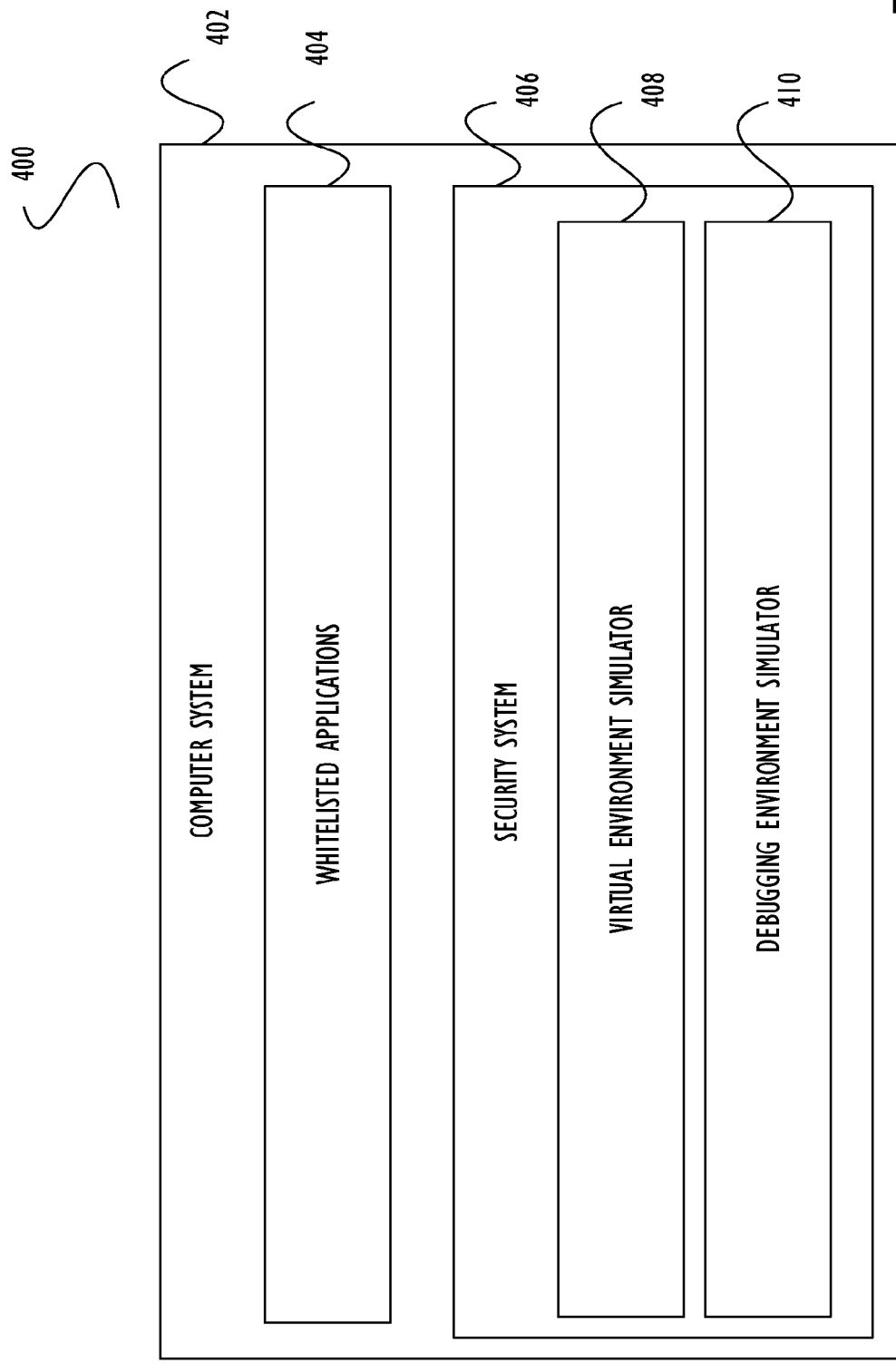
FIG. 4 illustrates a system for simulating at least one of a virtual environment and a debugging environment to prevent unwanted code from executing, in accordance with another embodiment.

FIG. 4 illustrates a system 400 for simulating at least one of a virtual environment and a debugging environment to prevent unwanted code from executing, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a computer system 402 is included. The computer system 402 may include any type of computer system. In one embodiment, the computer system 402 may include the servers 104 and/or clients 106 illustrated in FIG. 1.

In addition, the computer system 402 includes a whitelist 404 of whitelisted applications. In one embodiment, the whitelist 404 may be stored in the various storage mediums illustrated in FIG. 2, including RAM 214, ROM 216, disk storage units 220, etc.

In another embodiment, the whitelist 404 may include an identification of code (e.g. applications as shown) that is predetermined to be acceptable by the computer system 402 (e.g. predetermined to be allowed to execute, etc.). As an option, the determination may be performed by the computer system 402, a user, a policy, etc. In yet another embodiment, the whitelist 404 may identify one or more portions of the code that is determined to be acceptable by the computer system 402. For example, the whitelist 404 may list a protector application and/or packer application used by a legitimate commercial software developer that is predetermined to be acceptable.

In one embodiment, the whitelist 404 may store an identifier (e.g. name, etc.) of the whitelisted applications. In another embodiment, the whitelist 404 may store definitions of the whitelisted applications. In another example, the whitelist 404 may store a characteristic of the whitelisted applications. Of course, however, the whitelist 404 may store any information regarding whitelisted applications.

Additionally, the computer system 402 includes a security system 406. In one embodiment, the security system 406 may protect the computer system 402 against execution of unwanted code. For example, the security system 406 may protect against the execution of malware on the computer system 402. In another example, the security system 406 may protect against the execution of code that is not found in the whitelist 404.

Further, the security system 406 includes a virtual environment simulator 408 and a debugging environment simulator 408. In the context of the present embodiment, the virtual environment simulator 408 may include any simulator capable of simulating a virtual environment. Additionally, in the context of the present embodiment, the debugging environment simulator 408 may include any simulator capable of simulating a debugging environment.

For example, the security system 406 may use the virtual environment simulator 408 and the debugging environment simulator 408 to create a layer between the computer system 402 and code stored on the computer system 402 that simulates the virtual environment and/or the debugging environment. In one embodiment, the layer may lead unwanted code to believe that the virtual environment and/or the debugging environment is installed and/or executing on the computer system 402. For example, the layer may positively respond to queries from unwanted code indicating that the virtual environment and/or the debugging environment are installed and/or executing.

In another example, the security system 406 may use the virtual environment simulator 408 and the debugging environment simulator 408 to create one or more physical files, processes, etc. on the computer system 402 that simulate the virtual environment and/or the debugging environment. In this way, unwanted code that is created to be disabled from execution when a virtual environment and/or debugging environment are present on the computer system 402 may assume that the virtual environment and/or the debugging environment is present based on the simulation, and may thus be prevented from executing. As a result, the computer system 402 may be protected against execution of unwanted code.

In one exemplary embodiment, a request for executing an executable file may be identified by the computer system 402. Additionally, the simulation of the virtual environment by the virtual environment simulator 408 and/or the debugging environment by the debugging environment simulator 410 may be conditionally performed by the security system 406 based on the identification of the request. Just by way of example, the simulation may be performed if it is determined that the executable file is protected or packed utilizing a respective packer or protector that is not whitelisted.

Further, in another embodiment, it may be determined by the security system 406 whether a file in the computer system 402 is protected so as to preclude execution of the file in the virtual environment and/or the debugging environment. The simulation by the virtual environment simulator 408 and/or the debugging environment simulator 410 may be conditionally performed based on the determination. As an option, the simulation may be performed if it is determined that the file is protected, for preventing execution of the file.

Also, in still another embodiment, it may be determined by the security system 406 whether the file is packed. Additionally, the simulation by the virtual environment simulator 408 and/or the debugging environment simulator 410 may be conditionally performed based on the determination. For example, the simulation may be disabled from being performed if it is determined that the file is not packed.

Further still, in yet another embodiment, it may be determined by the security system 406 whether the file is legitimate. As an option, the whitelist 404 may be utilized to determine whether the file is legitimate. For example, the file may be compared against one or more files listed by the whitelist 404. Additionally, the simulation by the virtual environment simulator 408 and/or the debugging environment simulator 410 may be conditionally performed based on the determination. In one embodiment, the simulation may be disabled from being performed if it is determined that the file is legitimate.

As a result, commercial applications implementing packers and protectors, which may fail to execute on the computer system 402 due to simulation by the virtual environment simulator 408 and/or the debugging environment simulator 410, may be allowed to execute by disabling the simulation. Therefore, interference with commercial applications implementing packers and/or protectors may be avoided as a result of the simulation.

Figure 5:
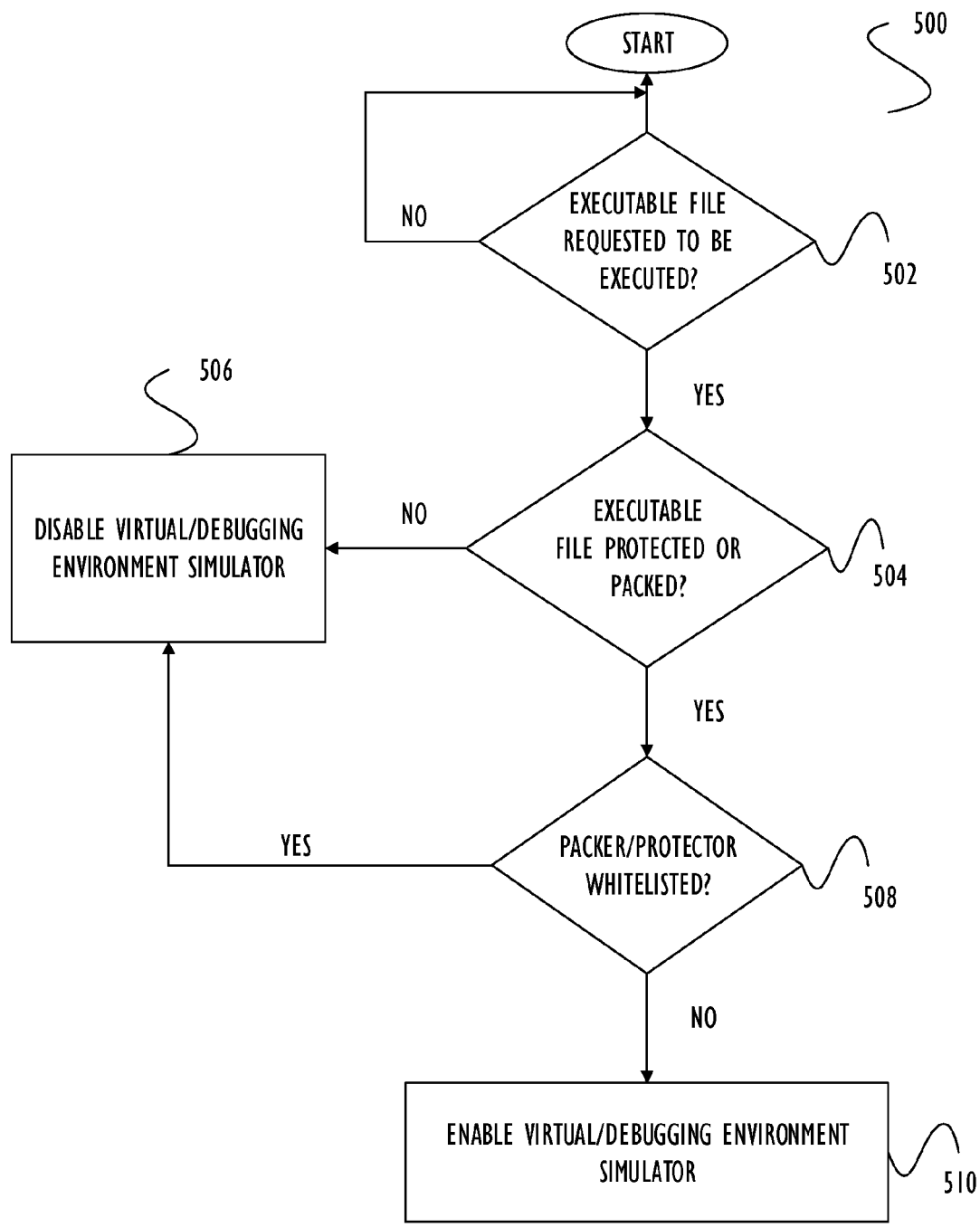
FIG. 5 shows a method for enabling a simulation of a virtual environment and/or a debugging environment, in accordance with yet another embodiment.

FIG. 5 shows a method 500 for enabling a simulation of a virtual environment and/or a debugging environment, in accordance with yet another embodiment. As an option, the method 500 may be carried out in the context of the architecture and environment of FIGS. 1-4. For example, the method 500 may be carried out utilizing the security system 406 of FIG. 4. Of course, however, the method 500 may be carried out in any desired environment. It should also be noted that the aforementioned definitions may apply during the present description.

As shown in decision 502, it is determined whether an executable file has requested to be executed. In the context of the present embodiment, the executable file may include any file that is able to be executed. For example, the executable file may include a binary file, a script, a program file, etc. In one embodiment, the executable file may include unwanted code. If it is determined that the executable file has not requested to be executed, then the determination shown in decision 502 is repeated.

If it is determined in decision 502 that the executable file has requested to be executed, then in decision 504 it is determined whether the executable file is protected or packed. In one embodiment, a portion of the executable file may be examined in order to determine whether the executable file is protected or packed. For example, it may be determined whether the executable file contains a protected or packed file structure. In another example, the executable file may include an identifier which identifies whether the executable file is protected or packed.

In another embodiment, an attempt may be made to analyze the executable file in order to determine whether the executable file is protected or packed. For example, a protected or packed file may not allow analysis of the executable file, and may therefore deny the attempt to analyze the executable file. In yet another embodiment, a heuristic method may be used to determine whether the executable file is protected or packed. Of course, however, it may be determined whether the executable file is protected or packed in any manner.

If it is determined that the executable file is not protected or packed, then in operation 506 simulation of a virtual environment and/or a debugging environment is disabled. In one embodiment, the simulation of the virtual environment and the debugging environment may be disabled by removing a file and/or a folder with a predetermined identifier indicating a presence of the virtual environment and/or the debugging environment. In another embodiment, a simulation of hardware with a predetermined identifier may be disabled for disabling the simulation.

In yet another embodiment, the simulation may be disabled by closing a predetermined port indicative of the virtual environment and/or the debugging environment. In still another embodiment, a simulation of an execution of a predetermined process may be disabled for disabling the simulation. In still yet another embodiment, a simulation of a predetermined central processing unit command may be disabled for disabling the simulation.

Also, in another embodiment, a simulation of hardware acceleration indicative of the virtual environment and/or the debugging environment may be disabled. In yet another embodiment, a simulation of an API response may be disabled for disabling the simulation. Of course, however, the simulation may be disabled in any manner.

If it is determined that the executable file is protected or packed, it is then determined whether the respective packer or protector utilized to protect or pack the executable file is whitelisted. See decision 508. In one embodiment, the determination may be performed by identifying the packer/protector and comparing the identification against a whitelist containing identifications of packers and protectors predetermined to be acceptable.

In another embodiment, the determination may be performed by identifying a characteristic of the packer/protector and comparing the characteristic against a predetermined list of characteristics of the whitelisted packers and protectors. Of course, however, the determination may be performed in any manner.

If it is determined in decision 508 that the packer/protector is whitelisted, then in operation 506 the simulation of the virtual environment and/or the debugging environment is disabled. As a result, packers and protectors that are deemed acceptable may not be subject to the simulation of the virtual environment and the debugging environment, thus allowing executable files associated with such packers and protectors to execute.

If it is determined in decision 508 that the packer/protector is not whitelisted, then in operation 510 the simulation of the virtual environment and/or the debugging environment is enabled. For example, the simulation may be enabled by including a file and/or folder with a predetermined identifier indicative of a presence of the virtual environment and/or the debugging environment, simulating hardware with a predetermined identifier indicative of a presence of the virtual environment and/or the debugging environment, etc. In this way, the simulation of the virtual environment and the debugging environment may be performed when packers and protectors associated with unwanted code request to be executed, for preventing execution of the unwanted code.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A non-transitory machine-readable medium on which are stored instructions, comprising instructions that when executed cause a machine to:
   identify a request to execute an executable file;
   disable simulation of a virtual environment during execution of the executable file responsive to a determination that the executable file is not protected or packed or a determination that a packer or protector used to pack or protect the executable file is whitelisted;
   enable simulation of the virtual environment during execution of the executable file responsive to a determination that the executable file is protected or packed and a determination that a packer or protector used to pack or protect the executable file is not whitelisted; and
   execute the executable file,
   wherein simulation of the virtual environment causes execution of the executable file to appear to be executing in the virtual environment even though elements of the simulated virtual environment are not present on the machine.

2. The machine-readable medium of claim 1, wherein the instructions that when executed cause the machine to enable simulation of the virtual environment comprise instructions that when executed cause the machine to simulate at least one of a file and a folder with a predetermined identifier.

3. The machine-readable medium of claim 1, wherein the instructions that when executed cause the machine to enable simulation of the virtual environment comprise instructions that when executed cause the machine to simulate hardware with a predetermined identifier.

4. The machine-readable medium of claim 1, wherein the instructions that when executed cause the machine to enable simulation of the virtual environment comprise instructions that when executed cause the machine to maintain a predetermined port open.

5. The machine-readable medium of claim 1, wherein the instructions that when executed cause the machine to enable simulation of the virtual environment comprise instructions that when executed cause the machine to simulate an execution of a predetermined process.

6. The machine-readable medium of claim 1, wherein the instructions that when executed cause the machine to enable simulation of the virtual environment comprise instructions that when executed cause the machine to simulate a predetermined central processing unit command.

7. The machine-readable medium of claim 1, wherein the instructions further comprise instructions that when executed cause the machine to determine whether the executable file is legitimate.

8. The machine-readable medium of claim 7, wherein the instructions that when executed cause the machine to determine whether the executable file is legitimate comprise instructions that when executed cause the machine to compare an identifier of the executable file against one or more file identifiers listed in a whitelist.

9. The machine-readable medium of claim 7, wherein the instructions that when executed cause the machine to enable simulation of the virtual environment are conditionally disabled responsive to a determination that the executable file is legitimate.

10. A method, comprising:
    identifying a request to execute an executable file on a machine;
    disabling simulation of a virtual environment during execution of the executable file responsive to a determination that the executable file is not protected or packed or a determination that a packer or protector used to pack or protect the executable file is whitelisted;
    enabling simulation of the virtual environment during execution of the executable file responsive to a determination that the executable file is protected or packed and a determination that a packer or protector used to pack or protect the executable file is not whitelisted; and executing the executable file, wherein simulation of the virtual environment causes execution of the executable file to appear to be executing in the virtual environment even though elements of the simulated virtual environment are not present on the machine.

11. The method of claim 10, wherein causing execution of the executable file to appear to be executing in the virtual environment comprises:

simulating at least one of a file and a folder with a predetermined identifier.

12. The method of claim 10, wherein causing execution of the executable file to appear to be executing in the virtual environment comprises:

simulating hardware with a predetermined identifier.

13. The method of claim 10, wherein causing execution of the executable file to appear to be executing in the virtual environment comprises:

maintaining a predetermined port open.

14. The method of claim 10, wherein causing execution of the executable file to appear to be executing in the virtual environment comprises:

simulating execution of a predetermined process.

15. A system, comprising:

a processor;

a memory on which are stored instructions, comprising instructions that when executed cause the processor to:

identify a request to execute an executable file;

disable simulation of a virtual environment during execution of the executable file responsive to a determination that the executable file is not protected or packed or a determination that a packer or protector used to pack or protect the executable file is whitelisted;

enable simulation of the virtual environment during execution of the executable file responsive to a determination that the executable file is protected or packed and a determination that a packer or protector used to pack or protect the executable file is not whitelisted; and execute the executable file, wherein simulation of the virtual environment causes execution of the executable file to appear to be executing in the virtual environment even though elements of the simulated virtual environment are not present on the system.

16. The system of claim 15, wherein the instructions that when executed cause the processor to enable simulation of the virtual environment comprise instructions that when executed cause the processor to simulate at least one of a file, a folder with a predetermined identifier, execution of a predetermined process, and a predetermined processor command.

17. The system of claim 15, wherein the instructions that when executed cause the processor to enable simulation of the virtual environment comprise instructions that when executed cause the processor to maintain a predetermined port open.

18. The system of claim 15, wherein the instructions that when executed cause the processor to disable simulation comprise instructions that when executed cause the processor to disable simulation responsive to a determination that the executable file is legitimate.

* * * * *